United States Patent
Yoneda et al.

(10) Patent No.: US 7,446,950 B2
(45) Date of Patent: Nov. 4, 2008

(54) METHOD OF MANUFACTURING A MOLDED ARTICLE, MANUFACTURING DEVICE AND OBJECTIVE LENS FOR OPTICAL PICKUP

(75) Inventors: Yasuhiro Yoneda, Iida (JP); Teruo Yamashita, Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/754,018

(22) Filed: May 25, 2007

(65) Prior Publication Data
US 2007/0229964 A1 Oct. 4, 2007

Related U.S. Application Data

(62) Division of application No. 10/809,408, filed on Mar. 26, 2004.

(30) Foreign Application Priority Data
Mar. 28, 2003 (JP) .............................. 2003-089584

(51) Int. Cl.
*G02B 13/18* (2006.01)
(52) U.S. Cl. ...................... 359/719; 359/718
(58) Field of Classification Search ................. 359/719, 359/721
See application file for complete search history.

(56) References Cited

U.S. PATENT DOCUMENTS

| 6,512,640 B2 * | 1/2003 | Ota et al. ..................... 359/719 |
| 6,515,808 B2 * | 2/2003 | Saito .......................... 359/721 |
| 2004/0100703 A1 * | 5/2004 | Kimura et al. ............. 359/719 |

* cited by examiner

*Primary Examiner*—Jordan M. Schwartz
(74) *Attorney, Agent, or Firm*—Sughrue Mion, PLLC

(57) ABSTRACT

A method of manufacturing an optical element, such as an objective lens, by heat-softening optical glass and press molding it with high precision in a pressing mold. The method comprises press-molding a molding material with a pressing device, comprising a pair of molds with prescribed shape, to make a molded article, measuring an optical property of the molded article, correcting pressing rate of at least one of the pressing molds based on the optical property thus measured, and further press-molding to make a molded article with the corrected pressing rate. The device has a means of driving one of the pair of pressing molds at a prescribed rate, a means for detecting an optical property, a shape or a number of the molded articles, and a means for controlling driving of the means of driving by correcting pressing rate of the molds based on the detected property, shape or number.

8 Claims, 5 Drawing Sheets

METHOD OF MANUFACTURING A MOLDED ARTICLE, MANUFACTURING DEVICE AND OBJECTIVE LENS FOR OPTICAL PICKUP

This is a divisional of application Ser. No. 10/809,408 filed Mar. 26, 2004. The entire disclosure(s) of the prior application(s), application Ser. No. 10/809,408 is considered part of the disclosure of the accompanying divisional application and is hereby incorporated by reference.

TECHNICAL FIELD

The present invention relates to a method of manufacturing a molded article in the form of an optical element such as a glass lens by heat-softening a glass material such as optical glass and press molding it with high precision in a pressing mold.

BACKGROUND ART

Recently, in the molding of optical elements such as optical glass lenses employed in optical devices such as cameras and pickups, numerous methods of manufacturing optical glass elements by press molding a heat-softened optical glass material in a mold made of metal, ceramic, or the like without processing such as polishing have been proposed and put into practice.

However, since the press-molded lens shrinks in the cooling step following pressing in this technique, it is impossible to obtain a lens to which the shape of the molding surface of the mold has been precisely transferred. Accordingly, a method comprising preparing a mold that has been processed into a shape canceling out the error in the shape of the lens relative to the molding surface and using it for pressing has been proposed.

For example, Unexamined Japanese Patent Publication (KOKAI) Heisei Nos. 6-72726 and 8-337426 disclose methods of press molding a glass material with a mold that has been preprocessed to a shape canceling out constant anomalies occurring in the lens due to shrinkage caused by cooling following press molding.

However, methods such as the above employing a mold that has been processed to a shape canceling out the error in shape of the lens present the following problems.

In methods of correcting the shape of the mold, the molding surface changes over time with the number of pressings even under stable pressing conditions, sometimes causing the shape of the mold to change slightly over time. Accordingly, an error in the shape of the lens occurs, and each time the permitted range is exceeded, successive mold-processing steps become necessary, with pressing being temporarily stopped during these mold-processing steps. As a result, there are problems in that the lead time from product order to product completion increases, production efficiency decreases, and cost increases.

Conventionally, so long as strict optical characteristics are not required, production has been continued and the change over time in the molding surface due to the accumulated number of pressings has been ignored even when there has been some error in lens shape. It has not been possible to employ methods of correcting the mold shape to handle such cases.

However, extremely precise optical characteristics are required of today's lenses, such as optical pickup lenses and image pickup lenses.

For example, high-density recording is conducted with high NA objective lenses for optical pickups. As a result, the diameter of the beam spot on the light focused on the optical disk has decreased. As this has occurred, reducing the amount of aberration generated by position error and tilt during lens installation and lens driving have become major technical issues. There is a need to improve the properties of the lens itself (reduce wave front aberration) prior to installation.

Improving the properties of the lens itself requires designing lenses with little wave front aberration and reducing lens manufacturing errors in the designed values of lenses. However, as the lens NA has increased and the wavelengths employed have shortened, the amount of aberration permitted due to manufacturing error, which is inversely proportional to the $2^{nd}$ or $3^{rd}$ power of the NA and inversely proportional to wavelength, has decreased (requirements have become stricter). Thus, it is actually quite difficult to stably manufacture high-performance lenses.

In converging optical systems for optical pickups, it is possible to achieve properties with configurations comprising multiple lenses and multiple lens groups. When this is done, although it is possible to relax the error permitted in the manufacturing of individual lenses, the increase in the number of lenses creates new problems in areas such as size reduction and adjusting the positioning between lenses. Accordingly, in converging optical systems for optical pickups, an individual lens (single lens) is required to have a high NA. However, the permissible error in manufacturing a single lens is smaller than that permitted to multiple lenses and multiple lens groups. For example, the permissible error for a single lens with an NA of 0.85 is 3 to 10 times stricter than for two groups of two lenses.

Further, while there is an upper limit to the refractive index in the lens material, the designing of high-performance high-NA lenses requires that the maximum surface inclination angle (the maximum angle formed between the normal at any point on a lens and the optical axis) of at least one surface of the lens be increased. To achieve reduction in size requires that the effective diameter of the lens and the lens outer diameter be reduced. These are also factors that have resulted in strict levels of permissible error in manufacturing.

The wave front aberration of a lens is comprised chiefly of spherical aberration, coma aberration, and astigmatism. In lens design, an optimal design is sought in which axial wave front aberration and spherical aberration are as close to zero as possible (since coma aberration and astigmatism result from manufacturing errors in lens surface inclination, eccentricity, and symmetry, they are naturally zero during the design stage).

Press molding of lenses having a wave front aberration of less than or equal to 0.04 $\lambda$rms during manufacturing requires first that spherical aberration, particularly third-order spherical aberration, be as low as possible: within ±0.02 $\lambda$rms, preferably within ±0.01 $\lambda$rms.

Spherical surface aberration is caused by manufacturing errors such as error in the radius of curvature of the lens surface (in the case of an aspherical surface, the paraxial radius of curvature) error in lens surface shape, error in lens thickness, and error in the refractive index of the lens material. In prior art mold processing techniques and pressing techniques, it is extremely difficult to precisely control and maintain stable precision of factors in lens spherical aberration such as surface shape precision and thickness precision. In particular, the generation of change in spherical aberration accompanying change in the surface state (a tribological characteristic of the mold separation film and glass) of the mold affecting mold transfer precision during continuous pressing, and ways of preventing it, have been completely unknown.

Mold shape precision and thickness control precision must be kept to within critical values of mechanical precision in mold processing machinery and press-molding machinery to reduce spherical aberration and control variation to within desired values. Accordingly, it is thought that the mass production of such lenses of high molding difficulty is practically impossible by controlling mold shape precision and thickness control precision.

In particular, in optical pickups employing a blue violet laser, it is necessary to reduce the spherical aberration of the entire optical system. Thus, an optical element is employed to correct the overall spherical aberration produced by installation error in the objective lens and other optical elements and positional and angular shift during driving.

However, when the amount of correction is large, the fifth-order spherical aberration increases markedly when third-order spherical aberration is reduced. As a result, wave front aberration increases, compromising the quality of the converged beam spot. Thus, the amount of aberration corrected for with the correcting optical element is desirably kept as low as possible.

Accordingly, it is first highly desirable to keep the spherical aberration due to the objective lens as low as possible, thereby increasing the aberration margin of the optical pickup system as a whole; there is a strong need for an optical pickup objective lens capable of doing this.

When attempting to achieve the required properties in small, high-performance lenses for image pickup systems, the error permitted in manufacturing is as low as in the case of optical pickup lenses. In small, high-performance image pickup lenses, sensitivity to error in eccentricity and inclination between upper and lower surfaces increases, and to the extent that coma aberration increases, it is necessary to reduce spherical aberration. There is a need for a lens for image pickup systems that has low spherical aberration.

Accordingly, the present invention, devised in light of the above-stated technical background, has for its goal to provide a method of manufacturing even high-performance lenses by stable and continuous press molding without reprocessing of the mold even under conditions where factors causing change an the precision and properties of the lens being molded during pressing are present.

In particular, the present invention has for its objects to provide a method of manufacturing high-performance lenses in which lenses having a difference between the actual value and the desired value of spherical aberration (third-order spherical aberration) in a high-NA single lens of within ±0.022 λrms, desirably within ±0.01 λrms, and preferably essentially zero, are stably and continuously press molded without reprocessing of the mold even under conditions where factors causing change in the precision and performance of the molded lens are generated during pressing, and to provide a lens in which the difference between the actual value and the desired value of spherical aberration (third-order spherical aberration) is within ±0.02 λrms.

The present invention focuses on the fact that even when continuously press molding a glass material under stable conditions, molding conditions are actually not constant, that is, the properties of the molded article (such as a lens) are not necessarily constant because of changes, for example, in the state of the mold separation film provided on the molding surface.

Further, by exploiting the fact that the amount of aberration occurring relative to the amount of error in the manufacturing of a high-NA single lens is large (error sensitivity is high and the error permitted in manufacturing is low), it is possible to control the precision of the third-order spherical aberration of the lens during press molding and stably mass produce high-performance lenses; the present invention was devised on this basis.

The present invention relates to a method of manufacturing a molded article by pressing a heat-softened molding material with a pair of pressing molds having molding surfaces processed to prescribed shapes (mode 1 of the manufacturing method of the present invention, hereinafter), comprising press-molding a molding material to make a molded article, measuring an optical property of the molded article, correcting pressing rate of at least one of the pressing molds based on the optical property thus measured, and further press-molding to make a molded article with the corrected pressing rate.

In this method, the correction of the pressing rate is preferably conducted based on a predetermined correlation between the pressing rate and the optical property.

The present invention further relates to a method of manufacturing a molded article by pressing a heat-softened molding material with a pair of pressing molds having molding surfaces processed to prescribed shapes (mode 2 of the manufacturing method of the present invention, hereinafter), wherein each time a prescribed number of molded articles is press-molded, pressing rate of at least one of the pressing molds is corrected and a molded article is further molded at the corrected pressing rate to maintain an optical property of the molded article within a prescribed range.

In this method, the correction of the pressing rate is preferably conducted based on a predetermined correlation between the number of molded articles being continuously molded and optical properties of the articles having been molded.

In the above two methods (modes 1 and 2), the optical property may be spherical aberration.

The present invention still further relates to a method of manufacturing a molded article by pressing a heat-softened molding material with a pair of pressing molds having molding surfaces processed to prescribed shapes (mode 3 of the manufacturing method of the present invention, hereinafter), comprising press-molding a molding material to make a molded article, measuring a shape of the molded article, correcting pressing rate of at least one of the pressing molds based on the shape thus measured, and further press-molding to make a molded article with the corrected pressing rate.

In this method, the correction of the pressing rate is preferably conducted based on a predetermined correlation between the pressing rate and the shape, said shape being the paraxial radius of curvature of either a first surface or a second surface of the molded article.

The present invention also relates to a pressing device comprising a pair of pressing molds having molding surfaces processed to prescribed shape, and a means of driving one of the pair of pressing molds at a prescribed rate to press mold a molding material supplied between the pressing molds, wherein the device farther comprises a means for detecting an optical property, a shape or a number of the molded articles and a means for controlling driving of said means of driving by correcting pressing rate of the molds based on the detected property, shape or number.

The present invention further relates to an objective lens for optical picking up, having a numerical aperture of greater than or equal to 0.6, a paraxial radius of curvature of less than or equal to 3 mm, an effective lens diameter of greater than or equal to 5 mm, and a maximum surface inclination of greater than or equal to 45 degrees with a third-order spherical aberration of within ±0.02 λrms at a prescribed wavelength (λ) of less than or equal to 430 nm; and an objective lens for optical picking up, having a numerical aperture of greater than or equal to 0.6, a paraxial radius of curvature of less than or equal to 3 mm, an effective lens diameter of greater than or equal to 5 mm, and a maximum surface inclination of greater than or equal to 45 degrees with a wave front aberration of less than or equal to 0.04 λrms at a prescribed wavelength (λ) of less than or equal to 430 nm.

BEST MODE OF IMPLEMENTING THE INVENTION

[Method of Manufacturing a Molded Article]

In the method of manufacturing a molded article of the present invention, a pair of pressing molds having molding surfaces processed to prescribed shapes are used to press a heat-softened molding material.

The molding material employed in the present invention includes glass, resin, and the like, but will be described below based on glass. Further, the molded article of the present invention may be an optical element such as a lens that has been molded out of glass or resin. The example of a glass lens will be described below.

Normally, various molding conditions change slightly during continuous press molding. For example, the mold separation film provided on the molding surface of a pressing mold undergoes a change in surface state with repeated pressing. After numerous pressing cycles, the mold separation film is worn down and deteriorates. Thus, the deteriorated mold separation film must be removed and regenerated. However, slight changes occur even at an initial stage where several shots to several tens of shots have been made after the commencement of pressing. Thus, the present inventors discovered that the properties of the optical elements that are pressed are affected.

The coefficient of friction of the mold separation film changes slightly as the number of molding cycles increases. This results in a change in the stress that is applied to the glass material that is pressed by the pressing mold to transfer the shape of the pressing mold. As a result, molded articles having various different residual stresses shrink slightly differently in the cooling step. This variation in shrinking behavior results in variation in lens shape, and in the end, variation in optical properties, particularly in spherical aberration.

The present inventors discovered that by varying the rate of pressing during pressing, it was possible to cause changes in optical properties due to residual stress that varies with repeat pressing to cancel each other out. Here, the term "rate of pressing" is used to mean the rate at which the pressing mold presses the molded material. When press molding is conducted by driving the lower mold, it means the rate at which the lower mold rises.

In the present invention, the term "optical property" may refer to aberration or the minimum spot diameter, for example. Examples of aberration are spherical aberration, astigmatism, and coma aberration. In particular, the optical property desirably refers to spherical aberration (third-order spherical aberration: SA3). However, it may also refer to optical properties other than those given as examples.

Figure 4:
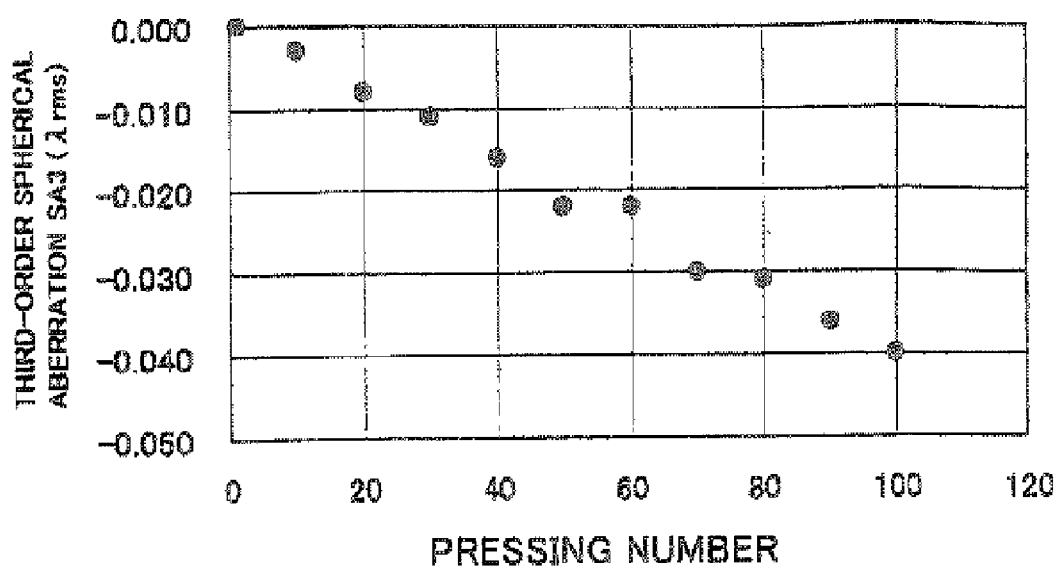
FIG. 4 shows the increase in the third-order spherical aberration as the number of pressings increases.

As press molding is repeated in a pressing mold, the absolute value of the third-order spherical aberration of the molded lens increases, although remaining quite low. This is shown in FIG. 4. The third-order spherical aberration is of great significance with regard to reproduction and recording properties in lenses in which single high optical properties are required in single lenses, particularly in objective lenses for optical pickups and the like. In the example shown in FIG. 4, investigation by the present inventors revealed that the absolute value of the third-order spherical aberration increased with the number of pressings despite being nearly zero at the start of pressing. Based on these results, in the present invention, the pressing conditions are altered so that changes in optical properties in the press molding step cancel out, causing the third-order spherical aberration to approach or reach zero.

Numerous conditions are applied to press molding. Among these, the present inventors discovered that the pressing rate had a certain correlation with third-order spherical aberration. As set forth further below, when the relation between the pressing rate and spherical aberration was examined in advance, a correlation such as that shown in FIG. 2 was found to exist. Accordingly, it was discovered that suitable adjustment of the pressing rate permitted correction that canceled out the spherical aberration increasing (deteriorating) with the number of pressings.

Accordingly, by determining the amount of change in spherical aberration resulting from a prescribed increase (or decrease) in the pressing rate, it is possible to measure the spherical aberration of the molded lens while continuously conducting press molding, and based on the measured value, increase or decrease the pressing rate to effect correction. By applying the corrected pressing rate, it is possible to continuously mold lenses constantly within tolerance with respect to spherical aberration. For example, when the spherical aberration of the molded lens increases negatively as the number of pressings increases, a gradual increase in the pressing rate is effective.

Further, by predetermining the amount of change in spherical aberration due to a prescribed number of pressings and by predetermining the amount of change in spherical aberration due to a prescribed increase (or decrease) in the pressing rate, it is possible to continuously or in stepwise fashion change the pressing rate once each prescribed number of pressings to continuously produce lenses with spherical aberration constantly within tolerance.

That is, in mode 1 of the manufacturing method of the present invention, it is possible to mold a molded article, measure an optical property of the molded article, correct the pressing rate of at least one of the pressing molds based on the optical property thus measured, and further press mold to make a molded article with the corrected pressing rate.

In mode 2 of the manufacturing method of the present invention, it is possible to correct the pressing rate of at least one of the pressing molds each time a prescribed number of molded articles has been press molded and further press mold to make a molded article at the corrected pressing rate to maintain an optical property of the molded article within a prescribed range. The correction of the pressing rate may be conducted based on a correlation between the number of molded articles being continuously molded and the optical properties of the articles that have been molded.

In mode 3 of the manufacturing method of the present invention, it is possible to mold a molded article, measure the shape of the molded article, correct the pressing rate of at least one of the pressing molds based on the shape thus measured, and further press mold to make a molded article with the corrected pressing rate. The correction of the pressing rate may be conducted based on a predetermined correlation between the pressing rate and the shape. The shape of the molded article may be the paraxial radius of curvature of a first surface or a second surface of the molded article.

The reason that the change in the molding conditions of the glass material as the number of moldings increases causes change in the optical properties of the lenses being molded is that the shape of the lens also changes. Since the method of measuring the optical properties of molded lenses in the manner stated above to correct the pressing rate can be conveniently conducted using a device measuring optical properties, it is extremely effective. However, depending on the lens, there are times when measurement of the optical properties (for example, spherical aberration) of a single lens is difficult. This is because a lens employed to form an optical system (such as an optical pickup system) with multiple lenses does not exhibit a wave front that can be measured for aberration as a single lens. In such cases, it suffices to directly measure the shape of the lens, which changes with the number of pressings.

Here, it was discovered that the pressing condition that changes (that is, changes based on a correlation with the pressing rate applied) based on a correlation with the spherical aberration is the radius of curvature for spherical surfaces and the paraxial radius of curvature for aspherical surfaces. Denoting the radius of curvature or the paraxial radius of curvature as R, there is a first-order correlation between R and the pressing rate.

Accordingly, by determining the amount of change in R resulting from a prescribed increase (or decrease) in the pressing rate, it is possible to measure the R of the molded lens while continuously conducting press molding, effect correction by increasing or decreasing the pressing rate based on the measured value, and apply the corrected pressing rate to constantly keep the designed shape with tolerance, that is, continuously mold lenses of adequate optical properties. For example, when the difference between the R of the molded lens and the design value of R decreases negatively as the number of pressings increases, gradually increasing the pressing rate is effective.

Further, by determining the amount of change in R resulting from a prescribed number of pressings and the amount of change in R produced by a prescribed increase (or decrease) in the pressing rate, lenses having a shape (that is, an optical property) constantly within tolerance can be continuously manufactured by changing the pressing rate in stepwise fashion or continuously once for each prescribed number of pressings.

[The Molding Device]

A molding device suitable for use in the present invention will be described next.

The manufacturing method of the present invention can be practiced using the molding device described below, for example.

The pressing device of the present invention has (1) a pair of pressing molds having molding surfaces processed to prescribed shapes, (2) a means of driving one of the pair of pressing molds at a prescribed rate to press mold a molding material supplied between the pressing molds, (3) a means of detecting an optical property, the shape, or the quantity of articles that have been molded, and (4) a mans for controlling driving of the means of driving by correcting the pressing rate of the pressing mold based on the information, i.e. optical property, shape or number, that is detected.

A mode of implementing the pressing device of the present invention will be described with FIG. 1.

Figure 1:
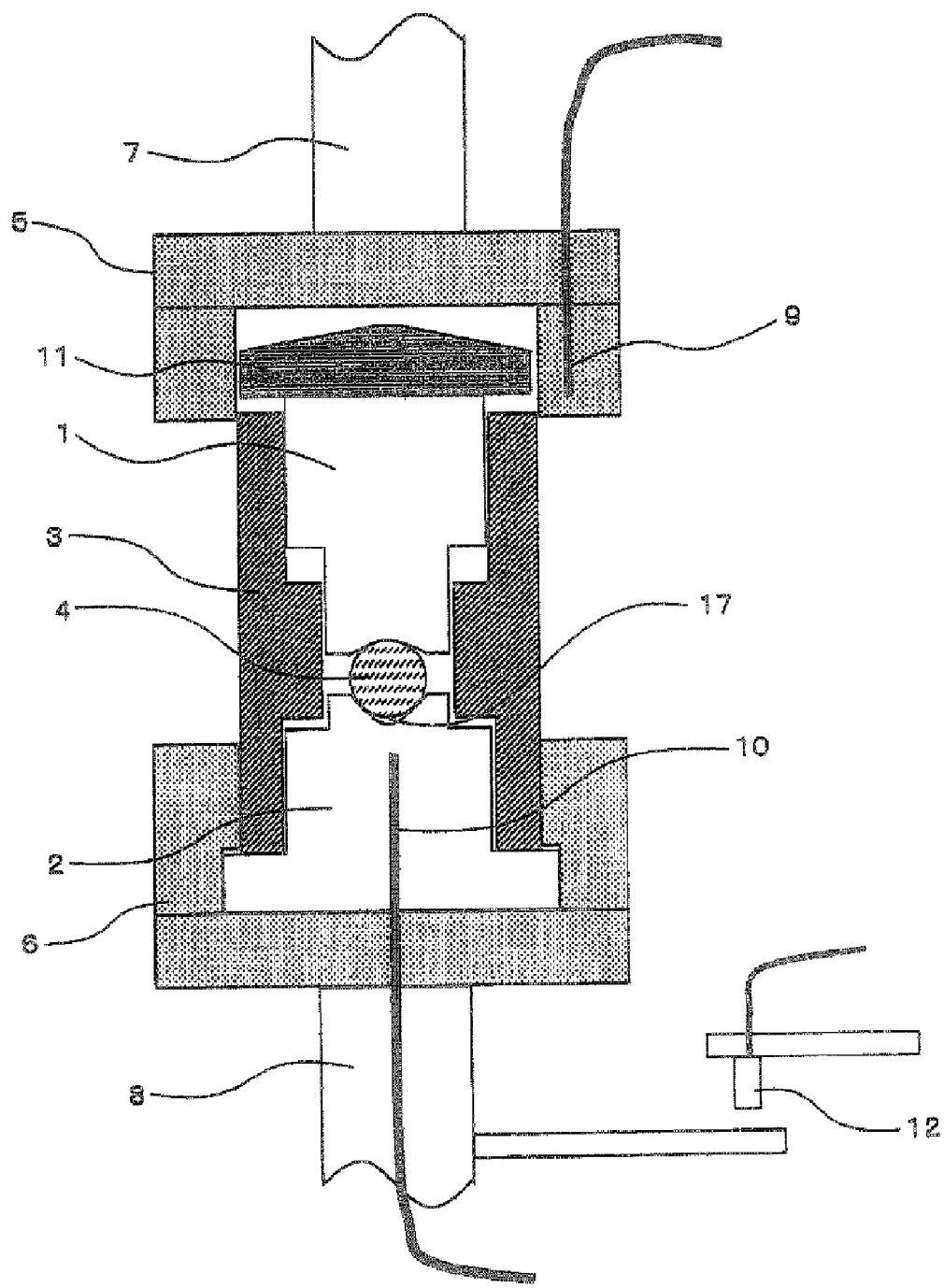
FIG. 1 is a partial sectional view of the pressing device suitable for use in the present invention.

FIG. 1 is a partial sectional view of the area of the mold in a pressing device suitable for use in the present invention.

As shown in FIG. 1, the pressing shafts are mounted with upper mold 1 riding on a mold pressing member 5 secured at the top to main shaft 7 and lower mold 2 riding on a mold holding member 6 secured at the bottom to main shaft 8 in an assembly with sleeve 3. Upper mold 1 and lower mold 2 constitute a pair of pressing molds. One of this pair of pressing molds is driven at a prescribed rate by a driving means, not shown, through upper main shaft 7 or lower main shaft 8. In the device of the configuration of FIG. 1, lower main shaft 8 moves upward and presses against upper main shaft 7 mounted on a secured mold pressing member 5 to press a glass material (preform 4). There is a cap 11 between upper mold 1 and upper pressing member 5. This prevents tilting of the upper and lower mold axes due to point contact with upper pressing member 5.

A ceramic such as SiC, $Si_3N_4$, or a hard metal may be employed as base material in upper and lower molds 1 and 2. A mold separation film is desirably provided on the molding surface. A mold separation film comprising a main component in the form of carbon, such as a DLC film, is useful. Since the mold separating film wears down and deteriorates as the number of pressings increases, it is desirable to take the press temporarily out of commission each time a certain number of pressings is reached and regenerate the film. For example, in a pressing device in which a DLC film has been formed on a mold base material such as SiC, the worn down, decomposed film is first removed with oxygen plasma, the oxide film of SiC generated in this process is removed with acid, and a new DLC film is formed to regenerate the mold separation film.

The atmosphere in the pressing chamber where the pressing device is located is desirably a nonoxidizing atmosphere. This is to prevent oxidation of the mold separation film. Desirably, a nitrogen atmosphere or an atmosphere containing a small amount of hydrogen added to nitrogen is employed.

The steps of molding with the pressing device of the present mode will be described. Glass material 4 is placed on lower mold 2, sleeve 3 and upper mold 1 are set, and the device is heated by a heating means, not shown. Although the heating means is not limited, examples are high-frequency induction coils, resistance heating, and infrared heaters. However, high-frequency induction heating is desirable due to heating efficiency and on/off responsiveness.

Once the pressing mold has reached a prescribed temperature, the lower main shaft is raised at a prescribed stroke and rate by the driving means (not shown) to press the glass material. The pressing rate at this time can be less than or equal to 10 mm/s, for example. Since the position of the lower mold can be detected by a position-detecting sensor 12, it is possible to change the pressing rate once the lower mold has reached a prescribed position. The pressing rate can also be calculated from the output of the position-detecting sensor.

The temperature of the glass during pressing can correspond to a glass viscosity of from $10^{6.5}$ to $10^{8.5}$ poises, preferably to a glass viscosity of $10^7$ to $10^8$ poises. The temperature of the pressing mold may be identical.

The glass material is pressed, the lower surface of the cap is brought into contact with the top surface of the sleeve, and cooling begins. Cooling may be conducted by cutting off power to the heating device, or in combination with a forced cooling means such as blowing air. The cooling rate may be from 30 to 100° C./min. Once a temperature below the Tg is reached, the pressing pressure is released. Once a temperature permitting removal is reached, the molds are separated and the molded article (lens) is removed. In continuous molding, these steps are repeated to mass produce lenses.

The present invention may also be employed when there is enclosed space between the glass material and the pressing mold due to the shapes of the glass material and the pressing mold, as shown on the lower mold side in FIG. 1. For example, this happens when the lens being molded has a portion with a smaller radius of curvature than the radius of curvature of the glass material. In that case, when press molding is conducted without evacuating the atmospheric gas trapped between the pressing mold and the glass material, there is a risk that indentations and the like will form on the surface of the molded optical element and that shape precision will be lost. Accordingly, a vacuum can be generated in the pressing chamber in the course of molding such glass materials, for example. Further, without generating a vacuum in the pressing chamber, it is possible to select temperature conditions and a pressing rate during pressing to both press and discharge the trapped atmospheric gas, permitting the molding of well-formed optical elements.

For example, in press molding with an enclosed gap, it is effective to employ a pressing rate of less than or equal to 0.5 mm/s, preferably less than or equal to 0.1 mm/sec. It suffices to employ such a pressing rate until the atmospheric gas trapped in the enclosed space has been discharged. That is, pressing is conducted up to the height of the enclosed space, and when the glass material has come into close contact near the center of the molding surface of the pressing mold, the pressing rate is increased. This is desirable to reduce the molding tact. In this case, the pressing rate that is the target of correction in the present invention may be the pressing rate prior to the increase or that following the increase, suitably selected in consideration of the correlation with an optical property or the lens shape.

Figure 5:
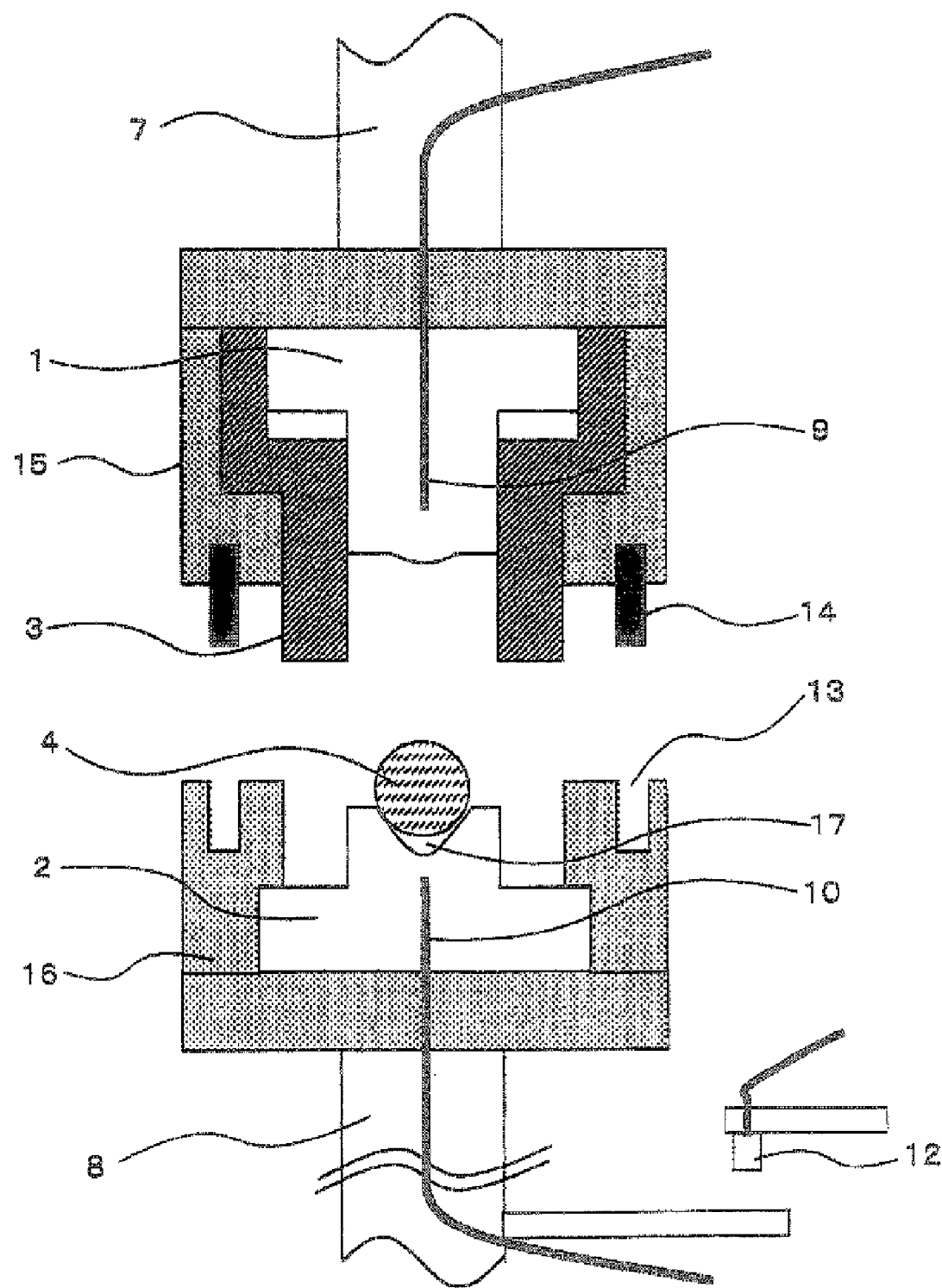
FIG. 5 is a partial sectional view of the area around the mold in a pressing device suitable for use in the present invention.

In the pressing device shown in FIG. 5, in contrast to FIG. 1 upper and lower molds 1 and 2 are separated by upper and lower main shafts. When the lower main shaft is raised, positioning hole 13 and positioning pin 14 cause the upper and lower mold support members 15 and 16 to come together. Upper and lower molds 1 and 2 and sleeve 3, precisely positioned by upper and lower mold holding members 15 and 16, then assemble smoothly. A sensor 12 is mounted in the same position as in FIG. 1 on the lower main shaft to permit control of the position and rate of rise (pressing rate) of the lower mold.

In the present mode, it is suitable to provide a preform feeding mechanism (not shown) for feeding a preform that has been preheated by a heating device to a temperature close to the pressing temperature, and an automatic removal device (not shown) removing the lens following the completion of pressing and mold separation. This is because feeding of the preform and the removal of the molded lens are possible without separating the pressing device, in contrast to the device in FIG. 1. By providing such mechanisms, it is unnecessary to cool the upper and lower pressing molds to close to room temperature when feeding the preform or removing the lens. Accordingly, pressing can be conducted with a short tact due to the short and good heat cycle of the pressing device in the course of continuous molding.

When conducting press molding with the molding device of FIG. 5, the pressing molds are heated to a prescribed temperature, the preform is heated to a prescribed temperature outside the pressing molds, and the heated preform is fed into the lower mold. Pressing may begin immediately following feeding, or after further heating of the pressing mold. The temperature of the glass material during feeding may correspond to $10^7$ to $10^8$ poises, and the temperature of the pressing mold may correspond to $10^7$ to $10^8$ poises. During pressing, the temperature of the glass also desirably corresponds to a glass viscosity of $10^7$ to $10^8$ poises.

After cooling, the lens can be removed at a lens temperature close to the Tg.

In the pressing device shown in FIG. 5, the same molding material and mold separation film as in the device of FIG. 1 may be employed. The same atmosphere in the molding chamber, heating device, and pressing rate as in the device of FIG. 1 may also be employed.

Figure 7:
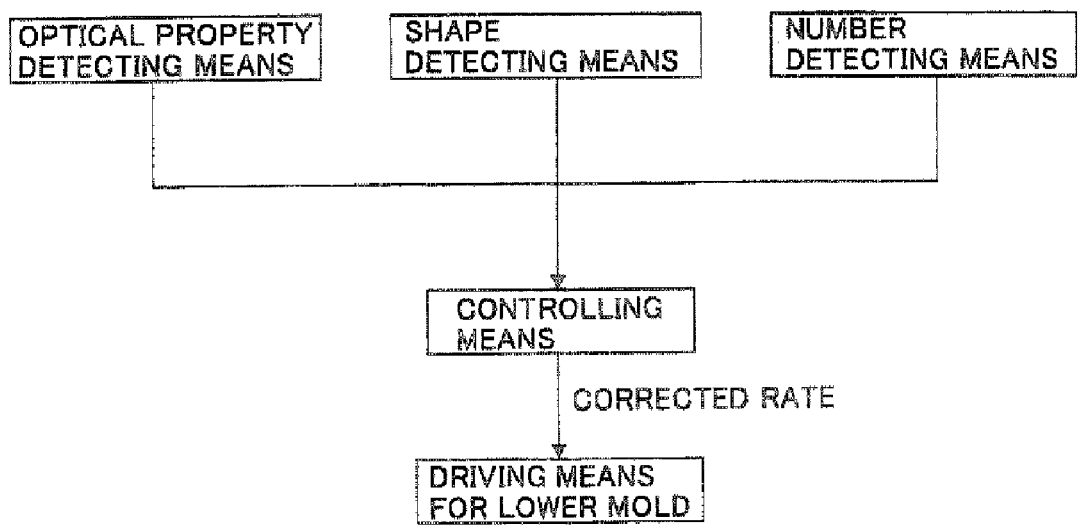
FIG. 7 shows the flow of signals between a means of detecting the optical property, shape, or quantity, a control means; and a lower mold driving means in a pressing device employed in the present invention.

The pressing device employed in the present invention also has (3) a means of detecting an optical property, the shape, or the quantity of articles that have been molded, and (4) a means for controlling driving of the means of driving by correcting the pressing rate of the pressing mold based on the information that is detected. Here, the optical property and shape are identical to those described in the manufacturing method. First, the detecting means detects an optical property, shape, or quantity. The control element then compares this to a predetermined prescribed value, and when a certain relation exists with the prescribed value (for example, the prescribed value has been exceeded), sends a signal to the mold driving means to correct the pressing rate. The flow of this procedure is shown in FIG. 7.

Specific examples of the device detecting the optical property, shape, or quantity of articles that have been molded are, a transmission interferometer for optical properties, a contact-type shape coarseness measuring device for shape, and a counter counting the number of preforms introduced and pressed for quantity.

Specific examples of means for controlling are control circuits controlling the feeding, heating, and conveyance of the preform, controlling heating and cooling of the mold, controlling the position and rising and dropping rates of the lower mold, and controlling the removal of the lens.

The shape of the optical element that is molded by the manufacturing method of the present invention with a manufacturing device is not specifically limited. Examples are the shapes of double convex lenses, convex meniscus lenses, concave meniscus lenses, and the like. The present invention is particularly suited to use with convex meniscus objective lenses, particularly those employed in optical pickups, because it permits high-precision maintenance of spherical aberration.

Both glass materials and resin materials are suitable as the molding material employed in the present invention. Spherical glass preforms and the like that have been preformed to a prescribed shape and weight may be suitably employed as the glass material.

Based on the present invention, the spherical aberration (absolute value) of the lens that is molded is desirably continually corrected by small amounts. In particular, the pressing rate is corrected so that the third-order spherical aberration is kept within ±0.03 λrms in the manufacturing of molded articles.

Further, in the manufacturing method of the present invention, the pressing rate is desirable corrected so that the paraxial radius of curvature is continuously kept within ±0.004 mm of the design radius of curvature in the molding of articles such as lenses.

Further, correction of spherical aberration can also be conducted by varying the thickness of the lens; this can be done in combination with the present invention. For example, the spherical aberration when press molding with a pressing mold prepared based on a prescribed spherical aberration design value can be corrected based on lens thickness, with further fine corrections being made by the method of the present invention.

It was discovered that there is a first-order correlation between the pressing rate and the aberration of the transmitted wave front and surface shape of a glass molded article such as a lens and that there is a high correlation between the curvature and pressing rate in the case of a lens in the method of manufacturing a molded article of the present invention. Accordingly, it is possible to predetermine this relation and then repeat the steps of measuring a property such as the curvature or aberration of a pressed lens or the like and changing the pressing rate based on the measurement result and the predetermined relation to conduct stable, continuous pressing.

Although the third-order spherical aberration has here been employed as the optical property that is measured in correcting the pressing rate, correction may be conducted based on some other optical property of a lens that changes with the number of pressings as dictated by the lens application or convenience afforded by the measurement method.

A lens having an aspherical surface on either one of two surfaces (surface 1 or surface 2) is a particularly suitable article for molding by the manufacturing device and manufacturing method of the present invention.

In particular, a marked effect is achieved when applied to a method of manufacturing objective lenses for optical pickup in which the tolerances for wave front aberration, lens curvature, and the like are extremely narrow, or when a lens based on the present invention is employed in an optical pickup device. Application is also possible to the manufacturing of lenses used not as single lenses in such devices, but configured in lens groups.

The manufacturing method of the present invention can be suitably applied as a method of manufacturing pickup objective lenses for optical disks of high recording density. For example, the manufacturing method of the present invention can provide the following aspherical lenses:

(1) High-NA single lenses in which the third-order spherical aberration at a prescribed wavelength (λ) of less than or equal to 430 nm is within ±0.02 λrms of a desired value, desirably within ±0.01 λrms thereof, and preferentially zero.

(2) High-NA single lenses in which the wave front aberration at a prescribed wavelength (λ) of less than or equal to 430 nm is less than or equal to 0.04 λrms, desirably less than or equal to 0.03 λrms, and preferably less than or equal to 0.02 λrms.

(3) Optical pickup objective lenses in the form of the lenses of (1) or (2) that are convex meniscus lenses or biconvex lenses with a numerical aperture (NA) of greater than or equal to 0.6, where at least surface 1 or surface 2 of the lens has a paraxial radius of curvature of less than or equal to 3 mm, an effective diameter of less than or equal to 5 mm, and a maximum surface inclination of greater than or equal to 45°.

(4) Optical pickup objective lenses in the form of the lenses of (1) or (2) that are convex meniscus lenses or biconvex lenses with a numerical aperture (NA) of greater than or equal to 0.65, where at least surface 1 or surface 2 of the lens has a paraxial radius of curvature of less than or equal to 3 mm, an effective diameter of less than or equal to 5 mm, and a maximum surface inclination of greater than or equal to 50°.

(5) Small image pickup lenses that are convex meniscus lenses or biconvex lenses where at least surface 1 or surface 2 of the lens has a paraxial radius of curvature of at least 3 mm, an effective diameter of less than or equal to 5 mm, and a maximum surface inclination of greater than or equal to 45°.

Here, the term "maximum surface inclination" is used to mean the maximum angle formed between the normal at any point on a lens and the optical axis.

Of these, optical pickup objective lenses having a numerical aperture of greater than or equal to 0.6, a paraxial radius of curvature of less than or equal to 3 mm, an effective diameter of less than or equal to 5 mm, a maximum surface inclination of greater than or equal to 45 degrees, a third-order surface aberration within ±0.02 λrms at a prescribed wavelength (λ) of less than or equal to 430 nm, and optical pickup objective lenses having a numerical aperture of greater than or equal to 0.6, a paraxial radius of curvature of less than or equal to 3 mm, an effective diameter of less than or equal to 5 mm, a maximum surface inclination of greater than or equal to 45 degrees, a wave front aberration less than or equal to 0.04 λrms at a prescribed wavelength (λ) of less than or equal to 430 nm lenses, which cannot be manufactured by prior art, are lenses that are themselves covered by the present invention.

EMBODIMENTS

The present invention is described in greater detail below through embodiments.

Embodiment 1

A convex meniscus lens 2.1 mm in diameter with a center thickness of 1.0 mm was molded with the pressing device shown in FIG. 1. Upper mold 1 and lower mold 2 consisted of an SiC base material coated with a DLC film on the molding surfaces, with the DLC mold being regenerated every 500 shots. The atmosphere in the pressing chamber was nitrogen gas.

A spherical preform made of a spherical optical glass material of 1.6 mm in diameter having an nd of 1.80610, an υd of 40.73, a yield temperature of 600° C., and a glass transition temperature of 560° C. was loaded onto the lower mold, the sleeve and upper mold were set, and heating was commenced with a heating device. In the present embodiment, heating was conducted with a high-frequency induction coil (not shown).

When the temperature had reached the pressing temperature of 645° C., the lower main shaft was raised at a pressing rate of 0.02 mm/s and pressing was begun. Such a low pressing rate was employed because of a gap 17 between lower mold 2 and preform 4; gas trapped in the gap was effectively discharged by pressing under these conditions. When the gap between the bottom surface of the cap and the top surface of the sleeve reached 0.5 mm, the pressing rate was switched to 0.06 mm/s and pressing was conducted until the bottom surface of the cap contacted the top surface of the sleeve. Here, the pressing rate switching position and pressing rate were controlled by a position-detecting sensor, shown in FIG. 1.

Following pressing, cooling was conducted at a rate of 60° C./min to 530° C. and the pressing pressure was released. Cooling was then further conducted to a temperature of 65° C. permitting removal, the molds were separated, and the lens was removed.

Measurement of the aberration of the lens by interferometer at the transmitted wave front to measure the optical property of the lens revealed a spherical aberration of 0.003 λrms. Since this was roughly the middle value of the specification, pressing was continued at the same schedule and the property was measured each 10 shots. When the relation between the pressing rate and spherical aberration was checked in advance, the correlation shown in FIG. 2 was determined. During the continuation of press molding, to restore a spherical aberration that had become a large negative value to zero, the correlation shown in FIG. 2 was employed to correct the pressing rate and continue pressing. FIG. 3 shows the spherical aberration of the lenses that were molded. The spherical aberration shown in FIG. 3 increased negatively with the shot number, but correction of the pressing rate kept it constantly within the permitted range (±0.031 λrms), constantly correcting it to near 0.

For comparison, FIG. 4 shows the change in spherical aberration when pressing was continued without correcting the pressing rate. As will be understood from the figure, the third-order spherical aberration progressively increased negatively as the number of pressings increased.

Since a DLC film was employed as the mold separation film on the mold in the present embodiment, it is possible that a phenomenon occurred whereby the gradual change in the coefficient of friction with the number of pressings caused the shape of the lens to change.

When a film other than a DLC film was employed as the mold separation film or when no mold separation film was employed, disregarding the absolute values an identical change in the coefficient of friction was observed, and correction of the third-order surface aberration was similarly possible by correcting the pressing rate.

By predetermining the relation between the pressing rate and spherical aberration and continuing pressing while correcting the pressing rate based on the spherical aberration measured each specified number of pressings in this manner in the present embodiment, it was possible to reduce the variation in spherical aberration. Thus, it was possible to continuously produce lenses at a high yield.

The present embodiment describes the regeneration of the mold separation film after the continuous pressing of 500 shots. Following regeneration, it was possible to return the pressing rate to the initial value and conduct pressing while repeatedly correcting the pressing rate.

Embodiment 2

A pressing device identical to that in FIG. 1 was also employed in Embodiment 2 of the present invention to mold lenses of identical shape using the same glass material. Here, the height of the sleeve was processed to a thickness 6 micrometers greater than the desired thickness to cause the spherical aberration of the lens to approach zero. The third-order spherical aberration of the pressed lens was −0.071 λrms. Calculation of the optimal thickness for achieving a spherical aberration of 0 from wave front measurement data collected at the time revealed that the thickness had to be reduced by 6 micrometers. Accordingly, the sleeve was processed to reduce the height of the sleeve by 6 micrometers from the initial sleeve height as per the calculation.

When this sleeve was employed in pressing under the same conditions as in Embodiment 1 (at a pressing rate of 0.07 mm/s), the third-order spherical aberration was 0.030 λrms. The permitted range being −0.025 to 0.025 λrms, this was outside the permitted range. Increasing the thickness by 2.5 micrometers to bring the third-order spherical aberration to 0 would have required increasing the sleeve height, which was impossible. Once the upper mold or the height of tie upper mold has been reduced by processing, conformity of the optical axes of the upper and lower molds is lost and the possibility of deterioration of the tilt of the lenses that are molded arises. Accordingly, varying the pressing rate was employed in the present embodiment.

Figure 2:
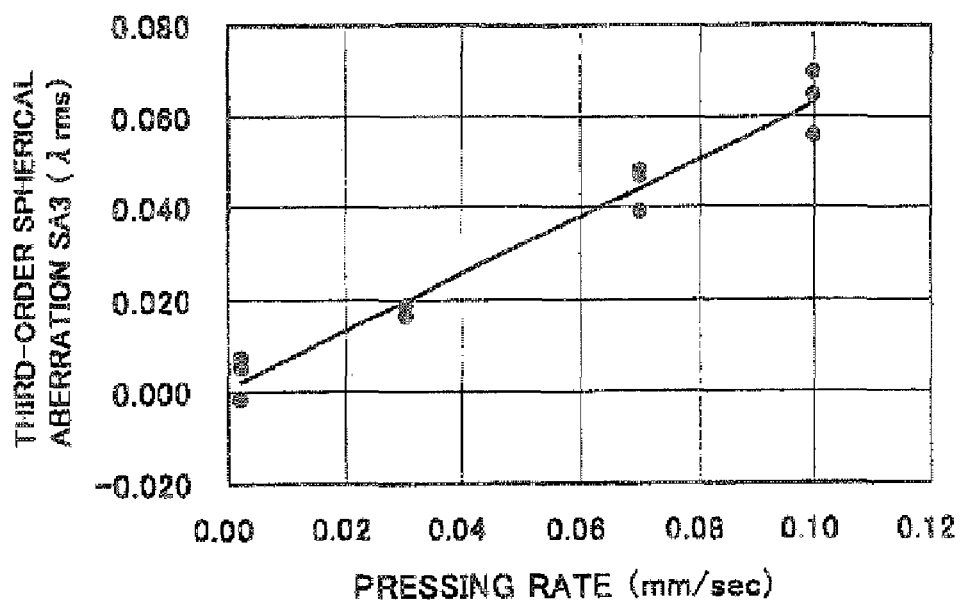
FIG. 2 shows the relation between the pressing rate and the third-order spherical aberration.
Figure 3:
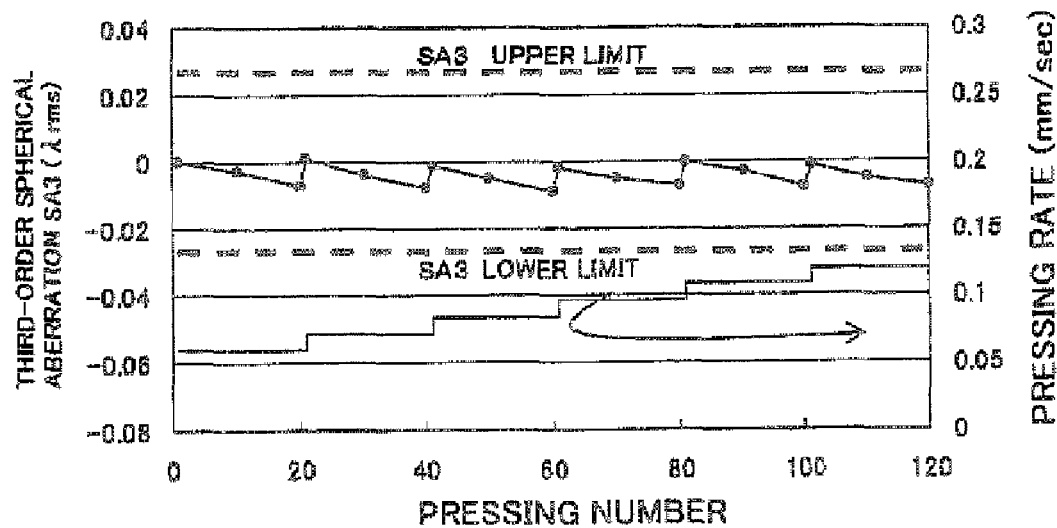
FIG. 3 shows the third-order, spherical aberration of a molded lens.

The relation between the pressing rate and third-order surface aberration in FIG. 2 revealed that reducing the third-order spherical aberration to 0 required reducing the pressing rate by 0.05 mm/sec. Accordingly, lenses were produced at a pressing rate of 0.02 mm/sec. Measurement of the third-order spherical aberration revealed a value of −0.002 λrms and that the desired property (within the permitted range) had been achieved. Pressing was begun under these pressing conditions and stable quality was obtained by the correction of the pressing rate employed in Embodiment 1.

The present embodiment shows that the method of correcting the third-order spherical aberration by varying the lens thickness by processing the height of the sleeve is suited to correction of pressing conditions in the present invention, or can be used in combination therewith. Since the method of the present invention does not require processing of the sleeve or mold, it is highly advantageous for production in that the lead time for obtaining the initial lens property can be greatly reduced.

Embodiment 3

Convex meniscus lenses having a center thickness of 1.7 mm and an outer diameter of 3.4 mm were molded with the pressing device shown in FIG. 5. Here, the gap present between the preform and the mold on the lower mold side was larger than in Embodiment 1, tending to cause shape defects such as indentations in the surface of the molded lens. Accordingly, a vacuum was generated in the molding chamber and press molding was conducted.

In the present embodiment, the device was placed in a molding chamber separated from the outside air and a vacuum pump (not shown) was used to generate a vacuum in the molding chamber.

A heating device was employed to preheat the glass material (preform) and a mechanism was employed to feed the preform onto the lower mold.

A spherical optical glass material 2.5 mm in diameter having an nd of 1.77377, an υd of 47.17, a yield temperature of 615° C., and a glass transition temperature of 570° C. was employed as the preform. The preform was heated to 645° by a heating device, not shown, and then fed onto lower mold 2 that had been heated to 650° C. At the time, upper mold 1 had also been heated to 650° C. The chamber containing the pressing molds was then evacuated to a vacuum of about 8 Pa by a rotary pump and pressing was begun. Upper and lower mold holding members 15 and 16 were pressed at a pressing rate of 0.06 mm/s until they came into contact. Gradual cooling was then conducted to 560° C. at a rate of 70° C./min, the pressing pressure was released, and lower mold 2 was lowered. The lens present on lower mold 2 was then removed by a lens-removing device and the pressing cycle was concluded. Upper and lower molds 1 and 2 and a preform 4 were then heated for the next pressing, and pressing was continued.

The relation between the pressing rate and the paraxial radius of curvature of the lens on the concave surface side was predetermined. In the present embodiment, the relational equation between the pressing rate and lens curvature (on the concave surface side) was given by the first-order equation:

$$R = -0.25 \cdot v + 6.9129$$

Here, R: Paraxial radius of curvature (R)(mm) of the aspherical concave surface v: Pressing rate (mm/s)

Figure 6:
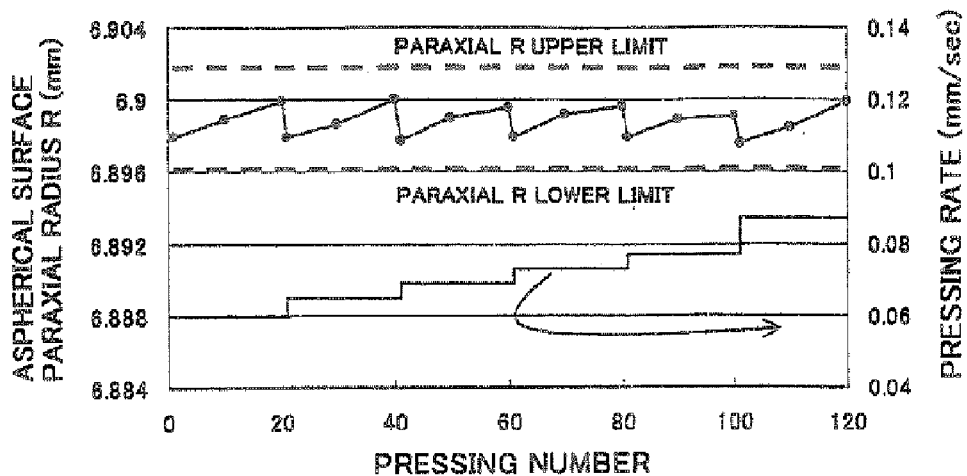
FIG. 6 shows the progression of aspherical surface paraxial radius of curvature R on the concave surface side with correction based on the pressing rate.

The pressing rate was corrected based on the results of measurement of the lens shape every 20 lenses after the start of pressing. FIG. 6 shows the progression of the paraxial radius of curvature (R) of the aspherical concave surface with correction of the pressing rate. The progression does exceed the permitted range.

In the present embodiment, a device generating a vacuum immediately prior to pressing was employed. This was an effective means of conducting pressing without residual gas in the gap formed between the form and the lower mold. It is also possible to reduce the pressing temperature to discharge gas in the gap. However, in the present embodiment, this would have required reducing the pressing temperature to 620° C., at which temperature it would have become difficult to change the pressing rate, and even were it changed, the change would not have been adequate to cancel out the change in the paraxial radius of curvature.

In the present embodiment as set forth above, reducing the pressure of the molding atmosphere immediately prior to pressing ensured a pressing temperature yielding a correlation between the pressing rate and the lens property, permitting the same stable pressing with high yields as in Embodiment 1.

The method of manufacturing a molded glass article of the present invention permits the ready manufacturing of lenses at high yields since, due to the relation between the pressing rate and a lens property (spherical aberration, lens curvature, or the like), variation in a lens property can be reduced simply by measuring the property of a pressed lens and conducting correction by varying the pressing rate, which is a pressing condition, based on the results. Further, even when a property of a lens pressed after processing the mold or some part thereof is outside the desired range, the property can be brought within the desired range by varying the pressing rate. Thus, the lead time required for correction processing of molds and parts can be reduced.

The present disclosure relates to the subject matter contained in Japanese Patent Application No. 2003-89584 filed on Mar. 28, 2003, which is expressly incorporated herein by reference in its entirety.

What is claimed is:

1. An objective glass lens for optical picking up, having:
at least one aspherical surface and an outer diameter of 3.4 mm or less,
a numerical aperture of greater than or equal to 0.65,
a paraxial radius of curvature of less than or equal to 3 mm,
an effective lens diameter of less than or equal to 5 mm, and
a maximum surface inclination of the aspherical surface of greater than or equal to 50 degrees with a third-order spherical aberration of within ±0.02 λrms at a prescribed wavelength (λ) of less than or equal to 430 nm.

2. An objective glass lens for optical picking up, having:
at least one aspherical surface,
a numerical aperture of greater than or equal to 0.65,
a paraxial radius of curvature of less than or equal to 3 mm,
an effective lens diameter of less than or equal to 5 mm and
a maximum surface inclination of the aspherical surface of greater than or equal to 50 degrees with a third-order spherical aberration of within ±0.02 λrms and a wave front aberration of less than or equal to 0.04 λrms both at a prescribed wavelength (λ) of less than or equal to 430 nm.

3. An objective lens of claim 1 which is an objective lens manufactured by press molding a glass material.

4. An objective lens of claim 2 which is an objective lens manufactured by press molding a glass material.

5. An objective lens of claim 1, wherein the objective lens is a double convex lens or a convex meniscus lens.

6. An objective lens of claim 2, wherein the objective lens is a double convex lens or a convex meniscus lens.

7. An objective lens of claim 1 wherein the center thickness is approximately 1.7 mm or less.

8. An objective lens of claim 2 wherein the center thickness is approximately 1.7 mm or less.

* * * * *